July 13, 1937.   H. F. BROWN   2,086,764
PIPE CUTTING MACHINE
Filed Aug. 26, 1935   4 Sheets-Sheet 1
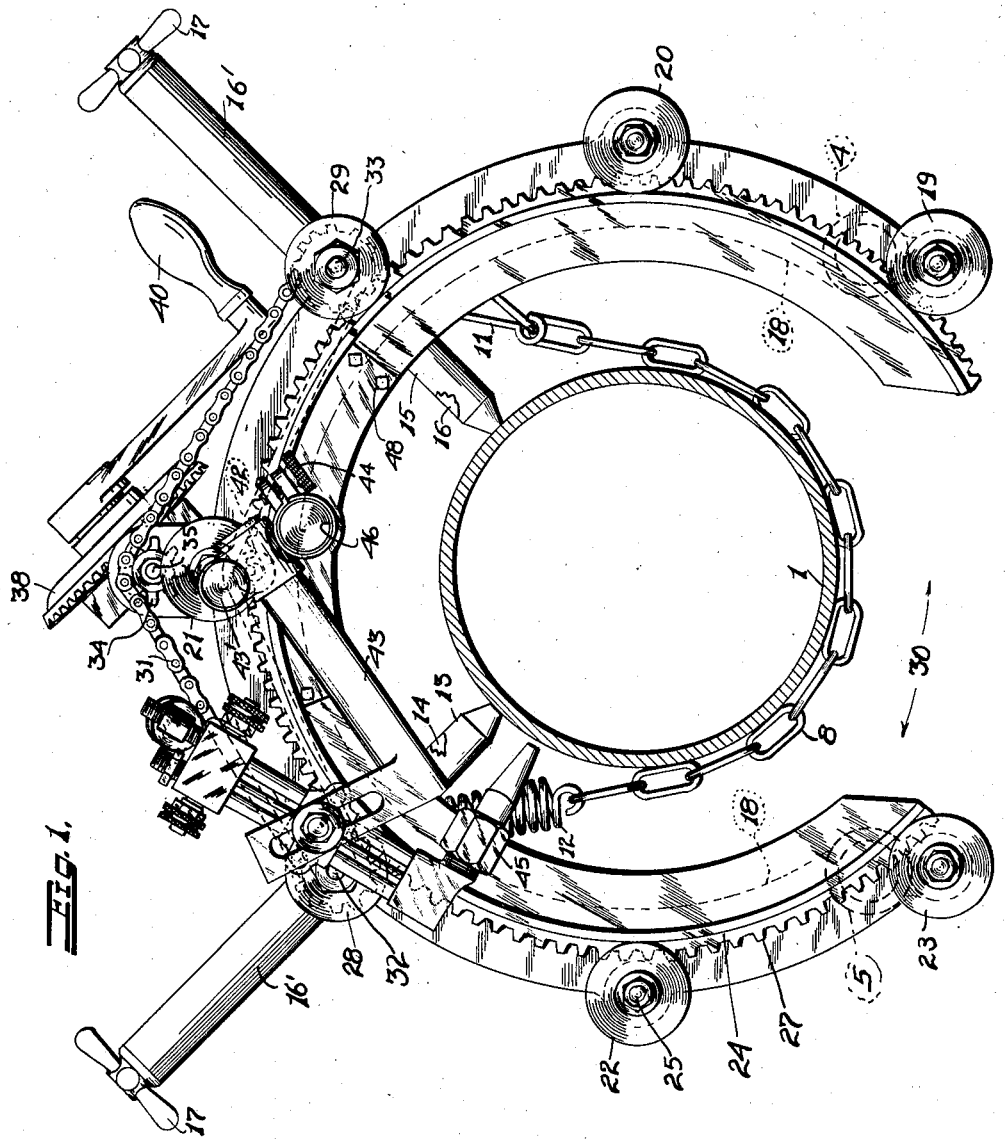
INVENTOR.
Hugh F. Brown
BY John H. Morgan
ATTORNEY.

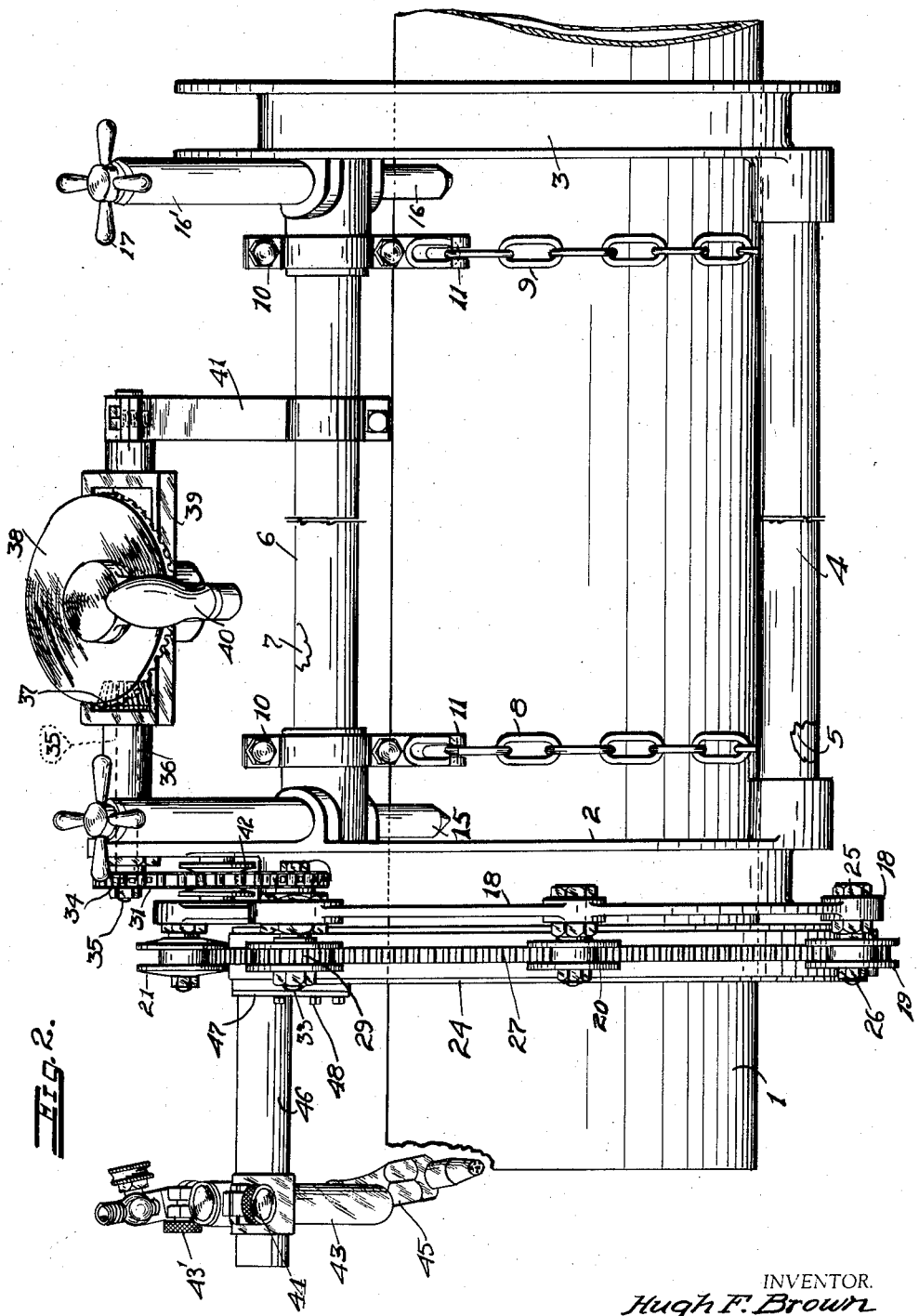

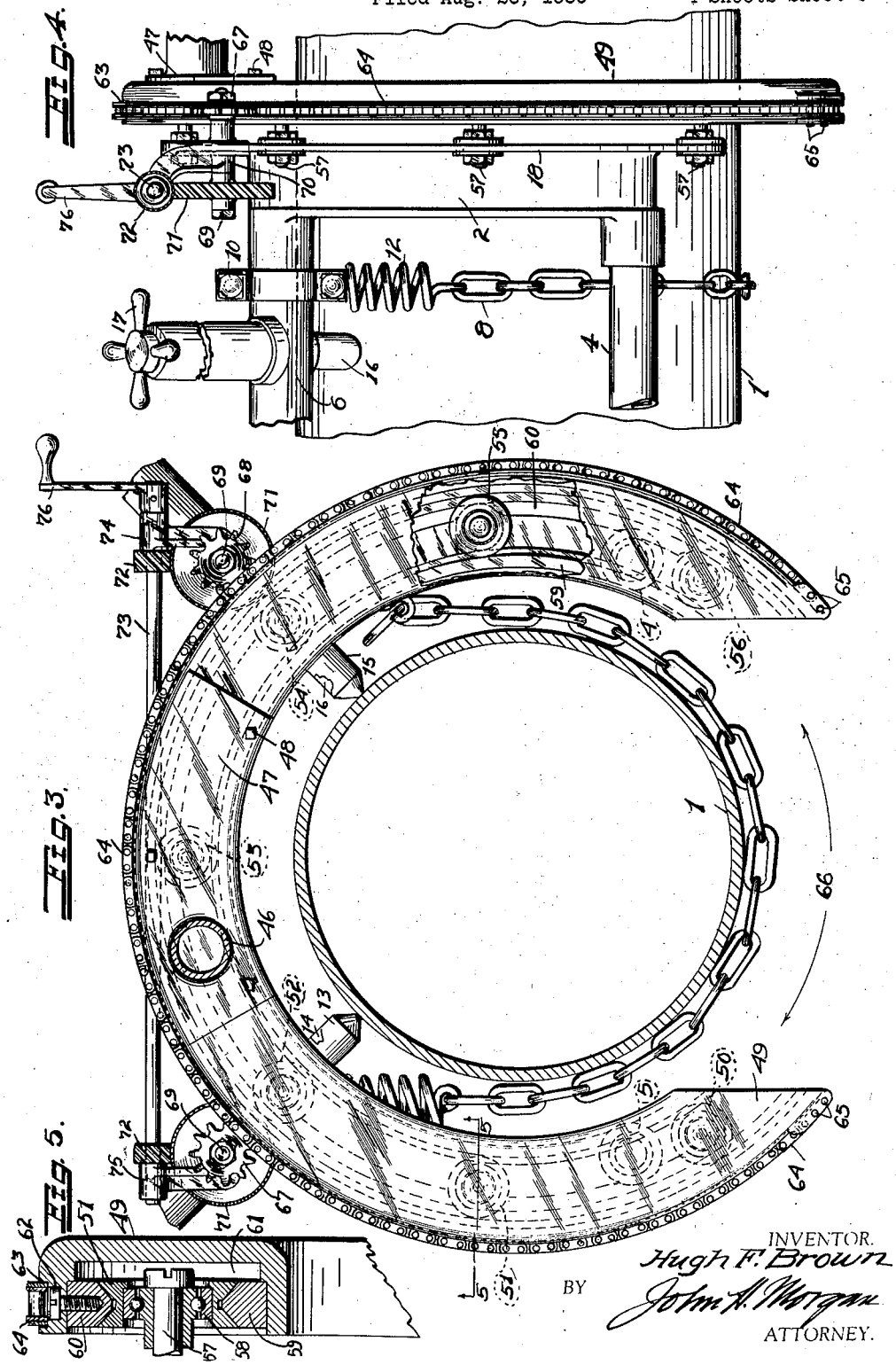

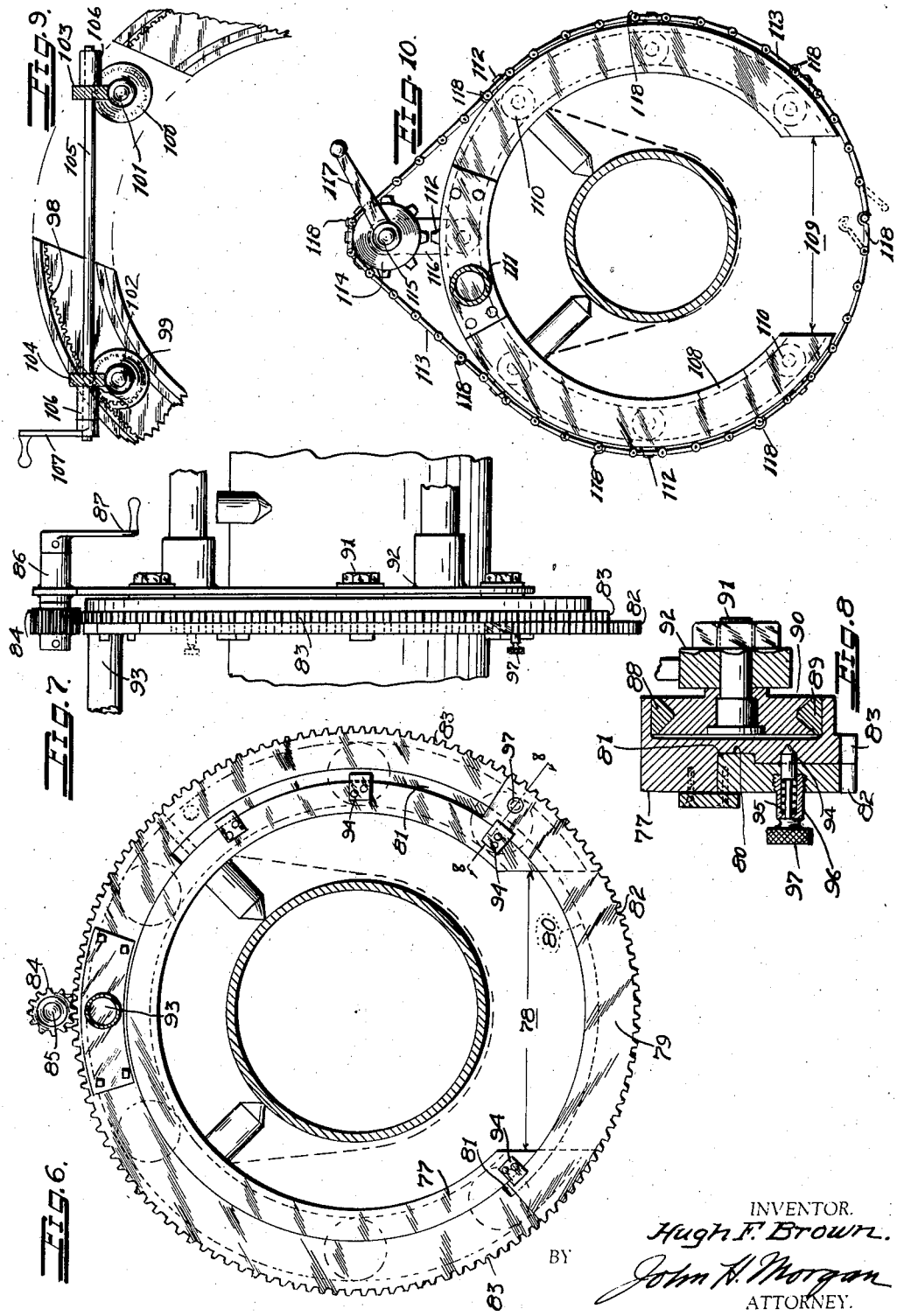

Patented July 13, 1937

2,086,764

UNITED STATES PATENT OFFICE 2,086,764

PIPE CUTTING MACHINE

Hugh F. Brown, San Francisco, Calif.

Application August 26, 1935, Serial No. 37,917

3 Claims. (Cl. 266—23)

This invention relates to improvements in pipe cutting machines of the class in which an oxyacetylene cutting torch is carried around the circumference of a pipe to be cut, by means of a rotatable ring mounted on a suitable frame.

The present invention is an improvement on my Patents Nos. 1,860,653, and 1,885,107. In these patents, and in other patents heretofore it was necessary to place the cutter carrying ring and its frame over the end of a pipe to be cut, and move it to the point where the cut was to be made in the pipe.

In certain pipe cutting operations it is required that the pipe be cut off close to the coupling of a connected pipe line, so that any type of machine that had to be placed over the end of the pipe could not be used for this operation. It is primarily the object of this invention to provide a pipe cutting machine that may be placed over the pipe at any point by means of a gap in the rotatable ring, and in the support for the ring, to allow for the passage of the pipe.

Another object is to provide a rotatably mounted ring adapted to carry a cutting torch, a segment of the ring being removed to allow it to be placed over a pipe to be cut, and a support member having an opening to correspond to the opening in the ring, and means to drive the ring continuously.

Another object is to provide a rotatable ring of this type that has gear teeth and a pair of spaced drive pinions in mesh with the teeth, and means to drive both of the pinions synchronously, whereby one or the other of the pinions are continuously in mesh with the ring teeth to allow for the missing segment in the ring.

Another object of the invention is to provide a rotatable ring having a segmental opening therein, and in place of the gear teeth, a chain is secured to the periphery of the ring. Two sprocket wheels are spaced to span the opening in the ring, and are in mesh with the chain, both of the sprockets being driven in unison.

Another object is to mount the ring concentric with the pipe to be cut on antifriction rollers supported on a suitable frame on the pipe.

Another object is to provide a rotatable ring to carry the cutting means in which a segmental opening is equipped with a slidable segment to close the opening after the ring is placed on the pipe. In this case there are gear teeth on the ring, and on the slidable segment. A drive pinion has a face wide enough to engage the teeth on the ring, and the teeth on the slidable segment.

Another object is to provide a rotatable ring having an internal track for guiding the ring concentrically of the pipe on rollers, two of the rollers being adapted to drive the ring either by friction on the track or having teeth on the track in mesh with teeth on the drive rollers.

Another object of the invention is to provide a rotatable ring having a segmental opening, or gap, so it can be placed over a pipe to be cut at any point, the periphery of the ring having sprocket teeth, and a drive sprocket having suitable bearings, over which sprockets there is an endless chain in mesh with the sprocket teeth. Between the ends of the opening, the chain is provided with easily operated detachable link couplings, preferably this detachable member is midway of the gap when it is in the lower position. This can be done by having a plurality of detachable links spaced apart a shorter distance than the span of the gap.

Other objects will appear to those skilled in this branch of engineering as the description progresses.

An embodiment of the invention is shown in the accompanying drawings in which the same reference numeral is applied to the same part throughout the several views and of which there may be modifications.

Figure 1 is a front elevation of the machine mounted on a pipe in position for cutting.

Figure 2 is a side elevation of the machine as shown in Figure 1.

Figure 3 is a front elevation of a modified form of the invention.

Figure 4 is a side elevation of the machine looking from the left of Figure 3.

Figure 5 is a section of the rotatable ring taken on line 5—5 of Figure 3.

Figure 6 is a modified form of rotatable ring having means for closing the gap in the ring.

Figure 7 is a side view of the ring shown in Figure 6.

Figure 8 is a section of the ring taken on line 8—8 of Figure 6.

Figure 9 is a modified form of driving means for the rotatable ring as shown in Figures 3, 4, and 5.

Figure 10 is a modified form of the invention in which a chain drive is used.

The numeral 1 indicates a pipe to be cut off. Placed on the pipe is a frame comprising the end members 2 and 3 having the bracing members 4, 5, 6 and 7. Supported by the members 6 and 7, are the chains 8, and 9, by means of the clamp members 10, adjusting hooks 11 and springs 12.

Adjustable screws 13, 14, 15 and 16 are adapted to hold the frame concentric with the pipe, the screw threads being housed in the pipes 16' to exclude dirt therefrom. Suitable hand wheels 17 are provided for the turning of the adjusting screws.

Integral with the frame member 2 is a flange member 18 adapted to carry the rollers 19, 20, 21, 22 and 23 which in turn carries the rotatable ring 24 to allow it to rotate concentrically with the pipe 1. The rollers are held in place by the bolts 25 and nuts 26 and are preferably provided with roller bearings on the bolts. The rotatable ring in this instance has the gear teeth 27, and in mesh therewith are the pinions 28 and 29 spaced apart a greater distance than the length of the opening 30 in the rotatable ring, so that one, or the other of the pinions are in mesh on the passing of the opening.

The two pinions are driven in unison in this instance by means of a chain 31 in mesh with sprocket wheels on the shafts 32 and 33 of the pinions, and the chain is driven by the sprocket 34 on the shaft 35 mounted in suitable bearings 36, and the shaft is driven by a bevel gear 38 mounted in a frame 39 and operated by the crank 40. The frame 39 is supported on its outer end by the standard 41 on the frame. An idler pulley 42 may be used to hold up the slack of the chain.

Mounted on the rotatable ring is the standard 43 adjustable by the clamp screw 43', and by the clamp screw 44, thus giving a double adjustment to the cutting torch 45, which may be of any standard make. The tubular member 46 projects from the plate 47 which is secured to the ring by bolts 48.

In the modified form of the invention shown in Figures 3, 4 and 5 the frame is of practically the same construction as shown in Figures 1 and 2, but the rotatable ring 49 is of different construction in some respects. The ring is supported on internal rollers 50 to 56 inclusive, which are secured to the flange 18 of the frame by bolts 57 which have ball bearings 58. The rollers are adapted to travel on rails 59 and 60 inserted in the annular groove 61 of the rotatable ring, and are secured in any suitable way. In this instance, screws 62 are used. In place of gear teeth on the periphery as shown in Figures 1 and 2, there is an annular groove 63 to receive a chain 64, the ends of which are secured to the ring by rivets 65 adjacent to the edges of the opening 66 in the rotatable ring. The chain is driven by sprocket wheels 67 and 68, and these sprocket wheels may be driven in any suitable way to drive them in unison, so that one or the other of the sprockets are driving the ring as the segmental opening is spanned. In this instance a spiral gear drive is shown, but it may be a worm gear drive, or bevel gears may be used. It will be seen that any means of driving the pinions, or sprockets may be used, provided they are driven synchronously.

The sprocket wheels are fixed on the shafts 69 which have suitable bearings 70 on the flange 18. A spiral gear 71 is fixed on each shaft, and is in mesh with the spiral drive gear 72 in each case, on the shaft 73 journaled in bearings 74 and 75 on the flange 18. A crank 76 is fixed to the shaft. The crank may be placed on either end of the shaft, or it may be changeable from one end or the other.

In the form of the invention shown in Figures 6, 7, and 8 the ring 77 has the segmental opening 78, and a slidable member 79 to span the opening. This member has the curved tongue 80 slidable in the groove 81 in the ring. There are gear teeth 82 on the slidable member and gear teeth 83 on the rotatable ring. A pinion 84 is adapted to drive the ring and is mounted on the shaft 85 in the bearing 86. A crank 87 is provided to turn the pinion. The ring has the internal tracks 88 and 89, on which the rollers 90 run, and are secured to the frame 92 by the bolts 91. A cutting torch not shown is attached to the standard 93. Clips 94 hold the slidable member in its groove. A pin 94 is provided to hold the teeth of the slidable member in transverse alignment with the teeth of the ring. There is a spring 95 in the holder 96. The knob 97 is used to raise the pin and move the member 79.

The modified form of the driving means shown in Figure 9 comprises the construction shown in Figures 3 and 5, the difference being that teeth are cut in the track as shown at 98, and two of the guiding rollers have teeth to mesh with the internal gear teeth as indicated at 99 and 100. Spiral or worm gears 101 and 102 are fixed on the roller shafts, and driven by the pinions 103 and 104, by means of the shaft 105, mounted in bearings 106, and turned by the crank 107. The ring could be turned by friction rollers instead of the toothed wheels, but the toothed wheels are more positive.

The form of the invention shown in Figure 10 comprises a rotatable ring 108 having a segmental opening 109 mounted on the same kind of frame as above described by means of the internal tracks engaged by the rollers 110, and having a standard 111 on which a cutting torch may be attached. On the periphery of the ring are sprocket teeth 112 which mesh with the chain 113 that passes over the sprocket 114 on the shaft 115 having a bearing in the frame 116. A crank 117 is fixed on the shaft. The chain is provided with easily detachable links 118 so that the chain can be uncoupled to place the ring over the pipe, and then coupled so that the ring may be rotated around the pipe. Any kind of a flexible belt could be used in place of the chain if provided with detachable couplings.

In general, the operation of the machine requires that the rotatable ring be turned so that the gap is on the lower side, to allow of placing the machine over the pipe until it rests on the adjustable screw members, then the chains that secure the machine on the pipe are brought under the pipe, and hooked up as tight as possible, and the screws are adjusted to hold the ring concentric with the pipe. In the form of machine having the slidable member to cover the gap in the ring, the slidable member is moved to the open position to allow of placing the machine on the pipe, and then it is moved to the closed position, and the stop pin, springs into place, to hold the gear teeth in alignment.

In the form shown in Figure 10 the sprocket chain is uncoupled to place on the pipe, and then coupled up under the pipe, whereupon the machine is ready for operation.

The above description taken with the drawings discloses very simple means to fulfill the object of the invention.

Having thus described my invention what I wish to secure by Letters Patent of the United States is as follows, but modifications may be had in carrying out the invention as shown in the accompanying drawings and in the particu- larly described form thereof within the purview of the annexed claims.

I claim:

1. A pipe cutting machine comprising a frame adapted to be placed over a pipe to be cut, a ring having a gap therein rotatably mounted on said frame, teeth on the periphery of said ring, a sprocket wheel mounted on said frame, a chain adapted to engage said sprocket and the teeth on said ring, a detachable coupling for said chain located in that part of the chain that crosses said gap, a cutting means on said ring, and means to turn said sprocket whereby the ring is rotated to carry the cutting means around the pipe.

2. A pipe cutting machine comprising a frame adapted to be placed over a pipe to be cut, a ring having a gap therein rotatably mounted on said frame, teeth on the periphery of said ring, a sprocket wheel mounted on said frame, a chain adapted to engage said sprocket and the teeth on said ring, a plurality of detachable couplings in said chain whereby a detachable coupling will lie over the gap when at the lower position, and a cutting means on said ring.

3. A pipe cutting machine of the class described, including a frame adapted to be fixed to a pipe to be cut; driving means on said frame; a segmental ring rotatably mounted on said frame; a belt encircling said ring and engaging said driving means; and cutting means on said ring.

HUGH F. BROWN.